March 29, 1960     E. S. LAWRENCE ET AL     2,930,228
APPARATUS FOR DETECTING AND RECORDING DEFECTS IN A STRIP
Filed Nov. 30, 1956     2 Sheets-Sheet 1
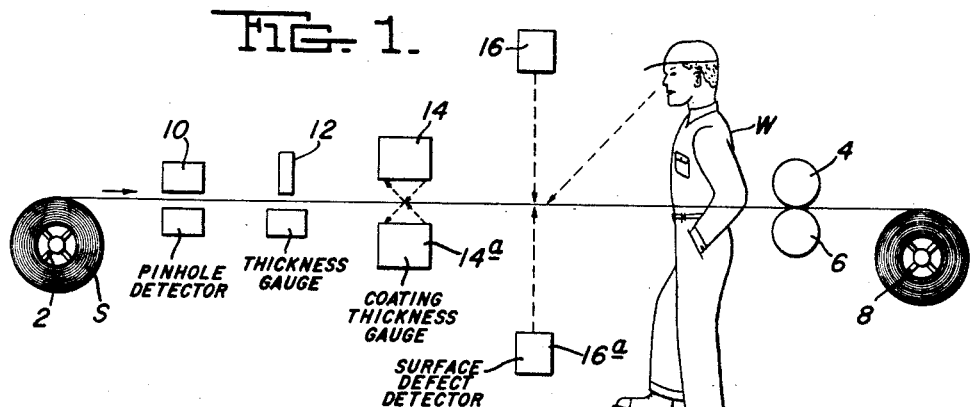
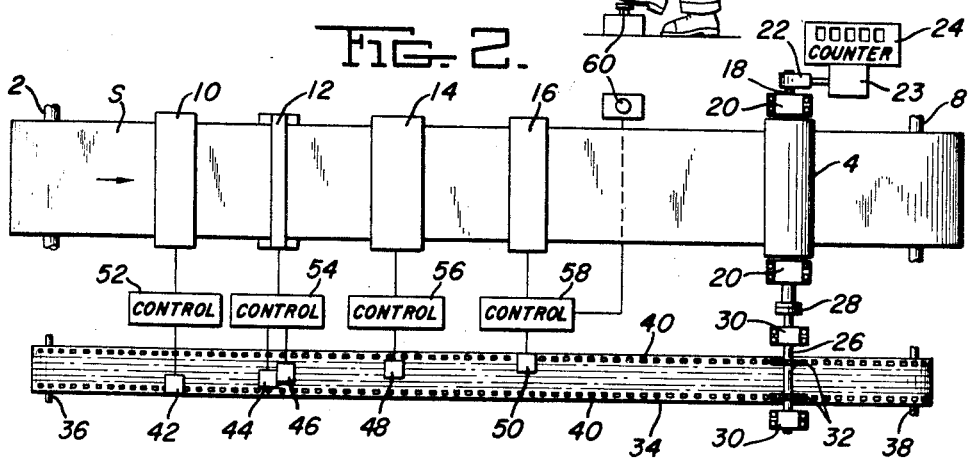
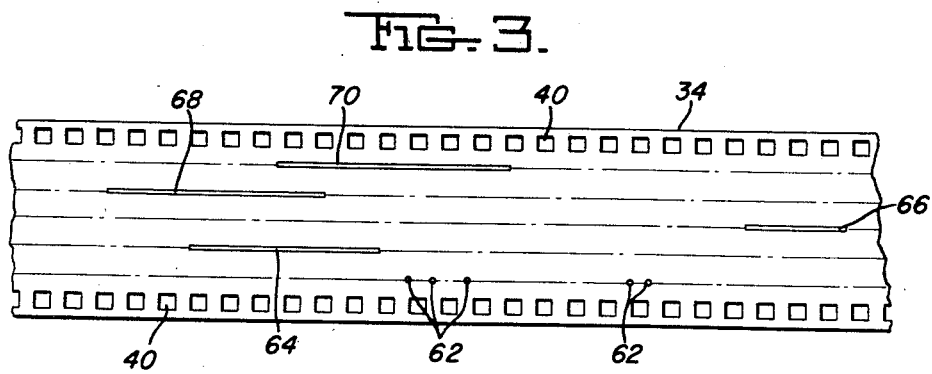
INVENTORS
EDWARD S. LAWRENCE and
EARLL R. MUDDIMAN,
By: Donald G. Dalton
their Attorney.

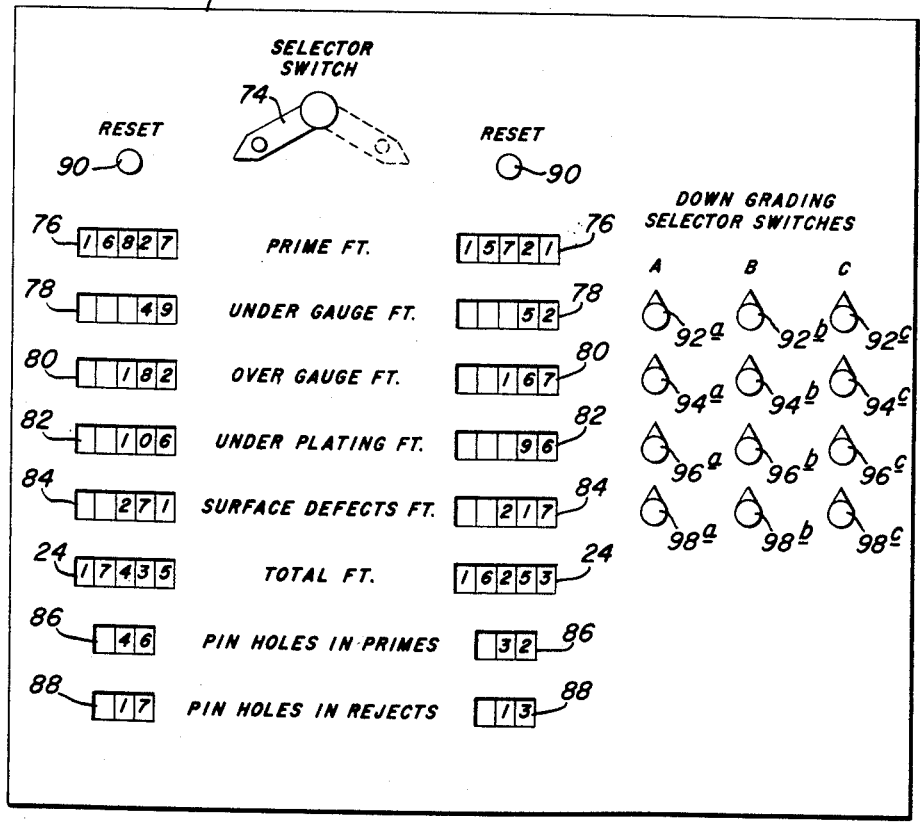

2,930,228

APPARATUS FOR DETECTING AND RECORDING DEFECTS IN A STRIP

Edward S. Lawrence, Pittsburgh, and Earll R. Muddiman, Levittown, Pa., assignors to United States Steel Corporation, a corporation of New Jersey Application November 30, 1956, Serial No. 625,535

2 Claims. (Cl. 73—159)

This invention relates to apparatus for detecting and recording defects in strip and more particularly to the detecting and recording of defects in long lengths of coated or uncoated metallic strip. When strip such as steel strip coated with zinc, tin or the like is sold in coil form it is advantageous to the purchaser to know exactly what types of defects are in the strip and exactly where these defects are located. It is especially advantageous if this inspection can be made as the last step in the processing of the strip. Determination of the amount of imperfect strip is also important in determining the value of the strip. To the best of our knowledge such inspection, recording and determination has not been accomplished prior to our invention.

It is therefore an object of our invention to provide apparatus for detecting one or more imperfections in a metallic strip and recording the position and type of imperfection.

This and other objects will be more apparent after referring to the following specification and attached drawings, in which:

Figure 1 is a schematic side elevational view of apparatus for detecting defects in a moving strip;

Figure 2 is a schematic plan view showing the apparatus of Figure 1 connected to recording mechanism;

Figure 3 is an enlarged view of the recording tape used with our invention; and

Figure 4 is a view of a counter panel usable in carrying out the method of our invention.

Referring more particularly to the drawings, the reference numeral 2 indicates an uncoiler for supporting a coil of strip S. The strip S is uncoiled from the uncoiler 2 and passes between measuring roll 4 and idler roll 6 to a coiler 8 where it is rewound. Located along the path of travel of the strip S are a plurality of inspection devices. Assuming that the strip to be inspected is tin plate, the uncoiler 2 may be located at the entry end of the tinning line and the coiler 8 at the exit end thereof with the inspection devices located adjacent the exit end of the line. However, the inspection line may be a separate entity, as shown. The inspection device may include a pin hole detector 10 such as shown in Chamberlin et al. Patent No. 2,229,638, a strip thickness gage 12 such as shown in Marshall et al. Patent No. 2,512,355, top and bottom plating thickness gages 14 and 14a such as shown in Beeghly et al. Patent No. 2,521,772 and top and bottom electronic surface defect scanners or detectors 16 and 16a. In addition, visual inspection for surface defects may be made by the workman W. The measuring roll 4 is attached to a shaft 18 which is rotatably mounted in bearings 20. One end of the shaft 18 carries a cam 22 which operates a switch 23, once for each revolution of the roll 4. The switch 23 controls the operation of a counter 24. Thus, the total length of strip is recorded or indicated on the counter 24. If desired more than one counter may be controlled by the cam 22 or switch 23. Shaft 18 is connected to a shaft 26 by means of a flexible coupling 28. Shaft 26 is supported in bearings 30 and has a pair of sprockets 32 mounted thereon for rotation therewith. A tape 34 extends between uncoiler 36 and coiler 38. Tape 34 is provided with holes 40 along each side thereof which are engaged by the teeth of sprockets 32. A plurality of markers 42, 44, 46, 48 and 50 are arranged above the path of travel of the tape 34 and are spaced apart transversely of the tape. The markers 42, 44, 46, 48 and 50 may apply various types of marks to the tape 34. For example, the mark may be visual, magnetic or sound, all of these being well known. The marker 42 is connected to be actuated from the pin hole detector 10 by means of a control 52. The markers 44 and 46 are closely adjacent one another and are actuated from gage 12 through a control 54. Marker 48 is actuated by the coating thickness gages 14 and 14a through control 56. Marker 50 is actuated from detectors 16 and 16a through a control 58. The operator W may also push a switch 60 which operates control 58 to actuate the marker 50.

The operation of our device is as follows:

As the strip S passes between the rolls 4 and 6 cam 22 will rotate to cause the counter 24 to indicate the total length of strip being inspected. At the same time tape 34 is moved forwardly by engagement of the sprockets 32 in the holes 40. The movement of the tape 34 may be at the same speed as the movement of the strip S, but at any rate must move at a speed having a known relationship with the speed of the strip S. The markers 42, 44, 46, 48 and 50 are located along the path of travel of the tape 34 in positions corresponding to the positions of their related inspection device along the path of travel of strip S. If the speed of the tape 34 is the same as the speed of the strip S the location of the markers will be at the same spacing and relative positions as their corresponding inspection devices. However, if the speed of the tape 34 is less than the speed of the strip S the markers will be more closely spaced than their corresponding detectors so that the mark made on the tape 34 will be at the same relative position on the tape as the corresponding defect on the strip. In other words, if the speed of the tape 34 is half the speed of the strip S the markers will be spaced apart half the distance between the corresponding detectors. In this manner the tape 34 need only be half as long as the strip S but a true record will be obtained. When a pin hole is detected in the strip the marker 42 will be actuated to apply a suitable mark 62 on the tape 34 at a position corresponding to the exact position of the pin hole. For this defect the marker 42 may well be a punch. It will be understood that the markers can be located so that they can compensate for any time delay in the operation of the controls. When the gage 12 detects that the strip is thicker than that desired the control 54 will operate marker 44 to place a mark 64 on the tape 34. The mark will continue as long as this condition exists. If the gage 12 determines that the strip is undergage, marker 46 will be operated by the control 54 to place a mark 66 on the tape 34. If the coating thickness is under that required, either one or both of gages 14 and 14a will operate the marker 48 through control 56 to apply a mark 68 to the tape 34. The gage 14 determines the thickness of the coating on the top side of the strip and gage 14a the thickness on the bottom side of the strip. If desired, separate markers could be provided for each of the coating thickness gages. When a surface defect on the top of the strip is detected by detector 16 or on the bottom of the strip by detector 16a the marker 50 will be actuated through control 58 to apply a mark 70 to the tape 34. If the operator W visually detects a defect on the surface of the strip S he operates the switch 60 to operate the marker 50. Each of the markers, except marker 42, will continue to apply the mark to the strip as long as the defect is present on the strip. Thus, it will be seen that the tape 34 records the duration and position of each defect. When the strip S is to be used to make tin cans or other products it is only necessary to study the tape 34 to determine the position and type of defect. The determination of the position and type of defect is provided by rerunning the tape 34. While the tape 34 is shown as flat it will be understood that any elongated tape such as a recording disc may be used for this purpose.

In order to determine the length of usable material in the strip the total length of moving strip is measured and it is determined which of the defects being inspected is the most serious. For example, in tin plate the strip having a coating thickness under that desired would not be usable, hence this is elected as the major defect and the length of such strip is determined and subtracted from the total length of strip. The length of strip having each of the other defects is also measured, but if the defect occurs in that portion of the strip having a thin coating thereon it is not measured. In some instances secondary defects may also be sufficient to eliminate the strip from use for one purpose but not for another. In that case the length of strip having the secondary defect, but not the major defect will be measured. When any of the remaining defects occur in the same length of strip as the primary or secondary defects they will not be measured. The number of pin holes in the prime and reject portions of the strip will be separately counted.

Figure 4 discloses a panel 72 having mounted thereon various counters which can be used in determining the length of usable material in the strip. As shown therein there are two sets of counters and a selector switch 74 for determining which set should be used. Each set of counters includes a counter 76 for measuring the length of prime strip, a counter 78 for measuring the length of undergage strip, a counter 80 for indicating the length of overgage sheet, a counter 82 for indicating the length of thin coated strip, a counter 84 for indicating the length of strip having a surface defect therein, a counter 24 for indicating the total length of strip, a counter 86 for indicating the number of pin holes in the prime strip and a counter 88 indicating the number of pin holes in the reject strip. A reset switch 90 is associated with each group of counters to reset the counters to zero. Three groups of selector switches A, B and C are also provided. Selector switches 92a, 92b and 92c are associated with undergage counter 78. Selector switches 94a, 94b and 94c are associated with overgage counter 80. Selector switches 96a, 96b and 96c are associated with underplating counter 82. Selector switch 98a, 98b and 98c are associated with surface defect counter 84.

In operation the selector switch 74 is moved to the broken line position shown so that the right hand group of counters are in operation. Assuming that underplating is the major defect, that surface defect is the secondary defect, that undergage is the third worse defect and that overgage is the least of the defects, selector switch 96a will be actuated so that the underplating counter 82 will operate at all times when that defect occurs. This also will prevent any of the gages 78, 80 and 84 from operating when the counter 82 is operating. Selector switch 98b is also actuated so that surface defect counter 84 will operate at all times when a surface defect occurs except if it occurs when counter 82 is operating. Selector switch 92c is actuated so that counter 78 will operate when undergage occurs only on strip which does not have the underplating or surface defect therein. Counter 80 will operate only when none of the other counters 78, 82 and 84 are operating. As the strip S moves from uncoiler 2 to coiler 8 between rolls 4 and 6, the counter 24 will be actuated each time the cam 22 contacts its actuator switch 23. The counter 76 will also be actuated each time the cam 22 actuates its actuating switch except when any of the detected defects except pin holes occur. When the counter 76 is operating and a pin hole is detected the counter 86 will operate. At all other times when a pin hole occurs counter 88 will operate. When an underplating defect occurs counter 82 will operate. When a surface defect occurs in that section of the strip having a proper coating thereon counter 84 will operate. When portion of the strip is undergage counter 78 will operate except when counters 82 and 84 are operating. Counter 80 will operate to indicate overgage only when none of counters 78, 82 or 84 are operating. In each instance the actuating switch for the counter will be operated by cam 22. When one coil of strip has been inspected and the readings indicated on the right hand set of counter as shown in Figure 4, selector switch 74 is moved to the full line position shown so that the left hand set of counters will work while the figures appearing on the right hand set of counters will remain thereon so that the operator can record the same at his leisure after which he presses the right hand reset switch 90 to return all the right hand set of counters to zero. It will be understood that only one of the downgrade selector switches, such as switch 96a, may be actuated in which case each of the counters 78, 80 and 84 will operate when their respective defects occur except when the major defect also occurs. In other words, if only downgrade selector switch 96a is actuated the counter 82 will operate at all times when the strip coating is too thin. Gages 78, 80 and 84 will operate when their defect occurs except when the counter 82 is operating. The readings on the counters can be utilized in determining the monetary value of the strip.

While one embodiment of our invention has been shown and described it will be apparent that other adaptations and modifications may be made without departing from the scope of the following claims.

We claim:

1. Apparatus for detecting and recording defects in a coated strip comprising means for moving said strip along a path of travel, a pin hole detector, a strip thickness gage, a coating thickness gage and a surface inspector spaced apart longitudinally along the said path of travel, an elongated tape, means for moving said tape along a path of travel at a speed having a known relationship with the speed of the strip, a pin hole marker, an overgage marker, an undergage marker, an off coating thickness marker and a surface defect marker located along the path of tape travel in longitudinal positions corresponding to the positions of the related inspection devices along the path of strip travel, said markers being spaced apart transversely of said tape, and a control operable by each of said inspection devices for actuating its corresponding marker when a defect occurs in the strip.

2. Apparatus for detecting and recording unlike imperfections in a metal strip comprising means for moving said strip along a path of travel, a plurality of inspection devices spaced longitudinally along the said path of travel, an elongated tape, means for moving said tape along a path of travel at a speed having a known relationship with the speed of the strip, a plurality of marking devices one associated with each inspection device and each located along the path of tape travel in a longitudinal position corresponding to the position of the related inspection device along the path of strip travel, each of said marking devices being spaced apart transversely of said tape, and a control operable by each of said inspection devices for actuating its corresponding marking device when an imperfection occurs in the strip, whereby like imperfections only are recorded in the same transverse position of said tape.

(References on following page)

References Cited in the file of this patent

UNITED STATES PATENTS

| | | | |
|---|---|---|---|
| 630,598 | Davis | Aug. 8, 1899 |
| 1,958,138 | Fowler et al. | May 8, 1934 |
| 1,969,221 | Johnson | Aug. 7, 1934 |
| 2,229,638 | Chamberlin et al. | Jan. 28, 1941 |
| 2,246,906 | Viebahn et al. | June 24, 1941 |
| 2,356,841 | Gregory | Aug. 29, 1944 |
| 2,512,355 | Marshall et al. | June 20, 1950 |
| 2,521,772 | Beeghly | Sept. 12, 1950 |